United States Patent Office 3,551,133
Patented Dec. 29, 1970

3,551,133
GRANULAR THICKENING AGENT AND PREPARATION
Billy A. Sprayberry, North Olmsted, and Richard L. Urbanowski, Painesville, Ohio, assignors to Diamond Shamrock Corporation, a corporation of Delaware
No Drawing. Filed Aug. 1, 1966, Ser. No. 569,095
Int. Cl. A01n 9/08
U.S. Cl. 71—116                9 Claims

ABSTRACT OF THE DISCLOSURE

A thickening agent composition of enhanced wettability and freedom from agglomeration in aqueous media consists essentially of granules having size not substantially in excess of about 14 mesh, with less than about 12 weight percent of the granules having size between about 40–60 mesh and less than about 5 weight percent having size finer than about 60 mesh. The granules are a granulated mixture of a particulate water dispersible substance, 10–70 percent of molasses, on a dry weight basis of such substance, and less than about 15 weight percent moisture; the substance is a blend of locust bean gum and a heteropolysaccharide.

---

This invention relates to a granular, water-dispersible thickening agent and to the method of preparing same.

A water dispersible composition of particular interest in combining with further ingredients to prepare, for example, a sprayable, pesticidally-active composition is a heteropolysaccharide-locust bean gum blend. Heretofore this blend has been prepared in the presence of molasses, which acts as a binder during preparation and as a dispersing assistant upon addition of the resulting product to water. The locust bean gum, heteropolysaccharide, and molasses are blended together to form a doughy mixture, then this resulting mixture is dried and milled to prepare a pulverulent product. However, after milling, the product can include a substantial proportion of fines which are difficult to disperse in an aqueous medium, often floating at the surface. They thereby start to wet only on the particle underside and can thereafter agglomerate, thus forming a gelatinous mass which eventually sinks into the aqueous medium but can be difficult to disperse.

It has now been found that such molasses-coated thickening agent can be prepared as a granulated product having excellent size uniformity without further processing. Moreover, such granules have excellent wettability in aqueous media, i.e., enhanced ability to thicken aqueous media, and are virtually free from the hereinabove described particle agglomeration. The granules can be readily dispersed in an aqueous medium in only a few minutes time, e.g., by merely gravity-feeding the granules to such a medium subjected to gentle to moderate agitation.

Broadly the composition is a granulated thickening agent, the granules of which agent have size not substantially in excess of about 14 mesh, with less than about 12 weight percent of the granules having size between about 40–60 mesh and with less than about 5 weight percent having size finer than about 60 mesh; the granulated thickening agent comprises a granulated mixture of the particulate, water dispersible substance, with from 10–70 weight percent, on a dry weight basis of such particulate substance, of molasses. Additionally, the molasses is employed as a coating for the particulate substance, and the granular product contains less than about 15 weight percent moisture.

Another aspect of the invention is the preparation of a granulated thickening agent by granulating a particulate, water dispersible substance while contacting such substance with molasses, and thereafter removing resulting granules from the granulator, classifying the resulting granules, and retaining classified granules having such size as disclosed hereinabove.

Another aspect of this invention is the preparation of a pesticidally-active composition from the granular thickening agent disclosed herein.

For convenience, the heteropolysaccharide-locust bean gum mixture is also referred to herein as a "water dispersible substance" or "blend" and the locust bean gum alone, or heteropolysaccharides alone as "water dispersible precursors." Additionally, the resulting product of such blend with molasses, prepared according to invention principles, is conveniently referred to herein as a "granular material," "granular product," or "thickening agent."

The heretofore disclosed thickening agent in particulate form and conforming to the critical size restrictions now established by the present invention, takes advantage of the density of such agent to yield a granular material which will readily settle into an aqueous medium. Granulation quickly and simply prepares such an agent having excellent size uniformity, and thus efficiently and economically prepares a water-settling material. Typically about 97–99 weight percent or more of continuously prepared, dried granules have size within the now-established essential range of 14–60 mesh.

Further, without being bound to any particular theory, it is believed that preparation of the thickening agent by granulation, i.e., by the building of the granule from the water dispersible substance contacted with molasses as the granules are forming and building, enhances the wettability of the granule and the binding ability of the molasses for the water dispersible substance, by substantially augmenting the proportion of molasses, and the uniformity of the molasses at the surface of the granule beyond that heretofore achieved. Therefore, while granule size combined with the granule mass density impart a water-settling characteristic to the product, this feature of particle size combines with granulation-achieved product wettability to afford fast dispersion of the product in aqueous media.

Locust bean gum, also known as the carob bean gum or carob gum, is derived from *Ceratonia siliqua L.*, a tree widely cultivated in Southern Europe and the Mediterranean area as well as Northern Africa. The gum is generally a pale buff-colored, odorless powder consisting of about 83% galactomannan. For economy, the molasses is preferably a straight cane refiners' syrup which is a dark brown syrupy liquid which is generally commercially available with an about 75 weight percent solids content.

The heteropolysaccharides for the particulate, water dispersible substance are high molecular weight exocellular materials prepared by the action of bacteria of the genus Xanthomonas on carbohydrates. Representative species of these bacteria which can be employed include *Xanthomonas begoniae*, *Xanthomonas campestris*, *Xanthomonas carotae*, *Xanthomonas corylina*, *Xanthomonas gummisudans*, *Xanthomonas hederae*, *Xanthomonas incanae*, *Xanthomonas lespedezae*, *Xanthomonas malvacearum*, *Xanthomonas holcicola*, *Xanthomonas papavericola*, *Xanthomonas phaseoli*, *Xanthomonas pisi*, *Xanthomonas translucens*, *Xanthomonas vasculorum* and *Xanthomonas vesicatoria*.

A variety of carbohydrates can be fermented with organisms of the genus Xanthomonas to produce the heteropolysaccharides. Suitable carbohydrates include glucose, sucros, fructose, maltose, lactose, galactose, soluble starch, corn starch, potato starch and the like. Preparation of these typical heteropolysaccharides is described in greater detail in U.S. Pat. 3,020,206.

Particularly for use as a pesticidal adjuvant, i.e., as a carrier material, or substance used as a part of mixture employed as a carrier material, for toxicological compositions which are effective in killing or controlling the growth of plants, insects, microorganisms, fungi, bacteria, and the like, which compositions are often commonly known as insecticides, bactericides, fungicides, nematocides, herbicides, and the like, an advantageous blend is a heteropolysaccharide-locust bean gum mixture having a weight ratio of heteropolysaccharide to locust bean gum between about 4:1 to about 1:4. Preferably, for economy as well as the preparation of aqueous, pesticidally-active compositions having suppressed drifting during spray application, the weight ratio of heteropolysaccharide to locust bean gum is between about 3:2 to about 2:3. The mixture is typically prepared by blending the heteropolysaccharide and the locust bean gum together in a ribbon blender to prepare a homogeneous, free-flowing powder for subsequent feeding to a disc granulator.

Generally the water dispersible precursors prior to graunlation have a major weight portion of particles finer than about 60 mesh, and can have average particle size as fine about 2–5 microns. Particulate precursors wherein a major portion of the particles are more coarse than about 60 mesh usually form void-containing granules which can readily crumble and are thus undesirable. Typically, the preferred heteropolysaccharide-locust bean gum blend has a major portion of the particles within the size range from about 80 to about 325 mesh.

These water dispersible precursors are granulated by the batch or continuous addition to a granulator, e.g., an inclined pan agglomerator or drum granulator, with an inclined pan, i.e., "disc granulator," being preferred for continuous granulation. The granulator is typically equipped with a feed solids inlet, product outlet, and spray apparatus for the addition of molasses, or molasses and additional water, to the particulate solids. While the granules are forming, from 10–70 weight percent, basis the dry weight of the gum, of molasses is added, generally by intermittent spraying. For spraying efficiency, the molasses is generally diluted with water to an about 35–60 weight percent solids content before use.

In operation, granule size will depend in part upon the amount of moisture available to the granules during their formation and building. This moisture can be contributed not only by the molasses but also by the locust bean gum, i.e., locust bean gum usually contains about 13 weight percent moisture. Generally, to enhance granule preparation, molasses and any additional water is added to the granulator, typically by operator controlled, intermittent or continuous spray, until the desired granulation size is attained. Alternatively the addition of molasses, or molasses and water to prepare the granules can be automatically controlled, such as by employing a gravimetric unloader to monitor the mass rate of solids leaving the granulator, and then adding liquid to obtain a predetermined mass rate of solids to the unloader.

An illustrative granulation of the present invention is that in which a batch of heteropolysaccharide-locust bean gum blend is processed on a disc granulator with the addition of molasses and water to the disc. Typically, blend is charged to a disc revolving at from about 15–35 r.p.m. and usually adjusted to an inclination of between about 20°–50° from the horizontal. During granulation, water and a molasses having about a 35–60 weight percent solids content, are intermittently or continuously sprayed, either alone or in combination, onto at least a portion of a shallow bed of fines located on the disc at the central to upper region of the disc raised from the horizontal. Agglomerated particles migrate on the surface of the disc, with larger agglomerates forming a deep bed of granules at a portion of the disc lowered from the horizontal. From this deep bed particles are discharged by the action of product displacement, over a rim around the disc perimeter, while freshly charged blend and fine agglomerate particles remain in the granulator. Discharged granules can be collected or can be further processed, e.g., can be compacted to harden the granules. Compaction can be performed on an outer portion of the disc located beyond the rim around the perimeter of the granulation zone.

After granulation, granular product is dried to contain less than about 15 weight percent moisture to obtain a free-flowing product of suppressed particle agglomeration during storage. Preferably for best freedom from lumping during storage and for best flowability upon use, the granular product contains between about 0.5–10 weight percent moisture. Air drying, infrared or other forced drying methods can be used to prepare the dried product.

After drying, granular product is screened through 14 mesh ("mesh" as used herein is U.S. Standard sieve series). Granules having size substantially in excess of about 14 mesh can retard the rapid dispersibility of the water dispersible substance of the granule. Typically about 7 weight percent or less of the freshly prepared granules will be retained at 14 mesh. Such retained granules can be thereafter reduced in size, e.g., by milling, and then added to the final product. The product passing 14 mesh is further screened at 40 mesh and the product passing 40 mesh is again screened at 60 mesh. Less than about 12 weight percent of the granular product should have size between about 40–60 mesh, and further less than about 5 weight percent should have size finer than about 60 mesh. This product, typically containing about 87–93 weight percent of granules having size between 14–40 mesh, upon addition to an aqueous media will prepare a highly desirable dispersion in generally about 5–20 minutes with gentle to moderate agitation, and often more quickly, e.g., in 10 minutes or less such as for the addition of about 4–5.5 pounds of granules to about 80–100 gallons of water. Typically, continuous granulation can consistently prepare a product having less than about 12 weight percent of the granules within the 40–60 mesh size range and thus obviate the need for screening the product at 40 mesh.

Fines passing 60 mesh can be eliminated from the final product during granule classification and returned to the granulator for further processing. If the final product contains more than about 5 weight percent of granules passing 60 mesh or contains more than about 12 weight percent of granules having size between about 40–60 mesh, some deleterious agglomeration of granular product can occur, either during addition of the product to aqueous media, or during subsequent formation of an aqueous dispersion, or both. Thus vigorous and/or extended agitation will be required to prepare a substantially uniform aqueous dispersion from the granules.

Often the granules are added to an aqueous medium, i.e., a liquid medium having a water continuous phase, and one or more pesticides are added to the water before, during, or after the addition of the granules to prepare a pesticidally-active formulation. Alternatively, dry pesticides can be blended with the granules prior to addition to aqueous media. Moreover, solid, ostensibly dry pesticidal agents (or "pesticidally-active ingredients") can be premixed with the adjuvant solids prior to granulation, i.e., such pesticides can be directly incorporated into the heteropolysaccharide-locust bean gum blend prior to granulation of the blend. Similarly, water soluble pesticidal agents can be directly incorporated into the granular product during granulation by blending with the molasses, or the molasses plus water, used in the granulation. Resulting granular products prepared to incorporate pesticidal agents in the granule can thereafter be blended with additional pesticidal agents, prior to, or with the addition of the granular product to an aqueous medium. For preparing a pesticidally-active formulation by one or more of these methods, the suitable pesticidal agents which can be used include the "hormone" or "systemic" type such as aryloxycarboxylic acid compounds.

In the following examples ways are shown in which the invention has been practiced but should not be construed as limiting the invention.

EXAMPLE 1

A heteropolysaccharide-locust bean gum blend containing 40 weight percent heteropolysaccharide and 60 weight percent of locust bean gum is prepared by mixing together a heteropolysaccharide prepared from the bacteria species Xanthomonas campestris having a molecular weight in excess of 200,000 and recurring units of D-glucose, D-mannose and the potassium salt of D-glucuronic acid in a ratio of 2.8:3.0:2.0. The locust bean gum has the following composition and particle size distribution:

|  | Percent |
| --- | --- |
| Moisture | 13.0 maximum |
| Protein (Kjeldahl) | 5.5 maximum |
| Fat | 1.0 maximum |
| Ash | 1.0 maximum |
| Granulation: | |
| Thru 60 | 98.0 minimum |
| Thru 100 | 80.0 minimum |
| Thru 200 | 30.0 maximum |
| Thru 325 | 20.0 maximum |

The resulting blend is charged at the rate of 3 pounds a minute onto a disc granulator. The granulator has a 49 inch diameter disc with the interior 39 inch diameter portion of the disc constituting a granulation bed which has at its perimeter a 3 inch riser, or rim, over which product is displaced from the granulation bed. Located concentrically around the granulation bed is a compacting ring portion of the disc having a width of 5 inches. The disc is tilted at 45° from the horizontal and rotates clockwise at a speed of 27 r.p.m.

The blend is charged to the granulation bed at about the 3 o'clock position of the disc approximately 3 inches in from the rim toward the center of the disc. At about the 10 o'clock position of the disc a turn bar in the granulation bed deflects large granules near the rim toward the deep bed of granules located at the portion of the disc lowered from the horizontal, but permits passage of finer granules under the turn bar and toward the portion of the disc raised from the horizontal. At about the 1 o'clock position of the disc a turn bar adjacent to the rim deflects fine material down from the region of the disc raised from the horizontal and subsequently under a spray nozzle continuously feeding a water-diluted molasses mixture to the material on the disc. Granular product discharges from the granulation bed by product displacement over the 3 inch rim, at about the 7 to 8 o'clock region of the granulation bed, and onto the compacting ring portion of the disc. At about the 10 o'clock region of the compacting ring a scraper bar turns back granular product from essentially that portion of the compacting ring raised from the horizontal.

The molasses employed in the granulation is a straight cane refiners' syrup having 77 weight percent solids which is diluted by water addition to 47 weight percent solids. During granulation the 47 solids percent syrup is continuously sprayed onto the disc at the rate of 1.61 pounds per minute.

Granular product discharging from the compacting ring is dried by passing through a forced air dryer and the dryer prepares a granular material containing 10 weight percent moisture. The product from the dryer, having 25 weight percent molasses solids, is screened and on a once-through basis, i.e., without milling of oversize product and without recycling fine product to the granulator, the dried product has the following particle size distribution: 5.5 weight percent retained on 14 mesh, 86 weight percent through 14 mesh and retained on 60 mesh, and 8.6 percent through 60 mesh. After milling of oversize, with recycling of fines to the granulator, the product on a continuous production basis has the following particle size distribution: 91.7 percent through 14 mesh and retained on 40 mesh, 8.2 percent through 40 mesh and retained on 60 mesh, and 0.1 percent through 60 mesh.

EXAMPLE 2

A comparative blend of molasses-modified, heteropolysaccharide-locust bean gum material is prepared in conventional manner, i.e., is prepared by mixing 40 weight percent heteropolysaccharide and 60 weight percent locust bean gum in a ribbon blender with the addition of about 20 weight percent, basis dry weight of the gum, of a 75 percent solids molasses. The resultant blend is dried at a temperature of about 165° F. for 25 minutes. Dried product is screened and the portion of the material retained at 16 mesh is milled and added to the product passing 16 mesh. The product thus prepared is ostensibly free from lumps but contains only about 15–25 weight percent of particles within the 14–40 mesh size range.

To a container having 400 parts of undisturbed water there is added 2.4 weight parts of Example 1 granular product; also, to a separate container having 400 weight parts of undisturbed water there is added 2.4 weight parts of the comparative particulate product prepared hereinabove. Each container is allowed to stand for 10 minutes and each is visually inspected for particle settling after 2 and 10 minutes of elapsed time. After 2 minutes only about 15 volume percent of the comparative material is observed to have settled into the water, whereas about 90 volume percent of the Example 1 granular product has settled. After 10 minutes only about 20 volume percent of the comparative material has settled as compared to about 95 volume percent for the Example 1 granular product. Moreover, the 80 volume percent balance of the comparative material forms a thick, scummy layer on the water surface.

Thereafter each sample is vigorously hand agitated with a spatula. After 10 minutes of this hand agitation the sample prepared from the comparative particulate product is observed to contain readily visible particles of undispersed material. Therefore only the sample prepared from the comparative particulate product is agitated for 10 minutes using a propeller agitator rotating at 3000 r.p.m. After this agitation the visible particles are dispersed in the sample. Each sample is then subjected to a shear force by mixing in a Waring Blender for 5 seconds at low speed. Thereafter, the viscosities of the samples (which are ostensibly free from air entrainment) are measured at 25° C. with a Brookfield viscosimeter using a No. 3 spindle rotating at 6 r.p.m. The viscosity of the sample formed from the granular product of the present invention (only hand stirred) is an excellent 5600 centipoises, but the viscosity of the sample prepared from the comparative material (with manual plus propeller agitation) is only 4000 centipoises.

In the manner described hereinabove, a separate 2.4 weight parts sample of the comparative material is added to 400 weight parts of undisturbed water, the water is left to stand for 10 minutes, and then the material is propeller agitated into suspension. However, the 10 minutes of propeller agitation is at only 800 r.p.m. since more active agitation, e.g., the 3000 r.p.m. used hereinabove, is more vigorous than agitation most generally available in conventional spray equipment used for preparing sprayable, pesticidally-active compositions. After the agitation at 800 r.p.m., the sample is visually observed to still contain large chunks of material having size of about 1/16 to 1/2 inch in diameter which are considered to be too large to pass through a screen or nozzle in any conventional spray rig.

It is to be understood that although the invention has been described with specific reference to particular embodiments thereof, it is not to be so limited, since changes and alterations therein may be made which are within the full intended scope of this invention as defined by the appended claims.

What is claimed is:
1. A thickening agent in granular form and having enhanced wettability, dispersibility and freedom from agglomeration in aqueous media, which granular thickening agent consists essentially of granules
   having size not substantially in excess of about 14 mesh,
   with less than about 12 weight percent of said granules having size between about 40–60 mesh and
   with less than about 5 weight percent having size finer than about 60 mesh,
wherein said granules comprise
   a granulated mixture of a particulate water dispersible substance,
   from 10 to 70 weight percent, on a dry basis of said substance, of a molasses, and
   less than about 15 weight percent moisture, basis total weight of said mixture, and
   wherein said substance is a blend of locust bean gum and a heteropolysaccharide in a weight ratio of heteropolysaccharide to locust bean gum between about 4:1 to about 1:4, and
   said molasses coats the particulate, water dispersible substance.

2. The composition of claim 1 wherein said granules are the dried residue from a granulated mixture comprising said particulate, water dispersible substance, said molasses, and water, and said dried residue contains between about 0.5–10 weight percent moisture.

3. The composition of claim 1 wherein said granules are the dried residue from a granulated mixture comprising said particulate, water dispersible substance, said molasses, and a pesticidally-active ingredient.

4. A method for preparing a thickening agent in granular form and having enhanced wettability and freedom from agglomeration in aqueous media, wherein the granules of said thickening agent comprise a molasses-coated, particulate water dispersible substance consisting essentially of a blend of locust bean gum with a heteropolysaccharide in a weight ratio of heteropolysaccharide to locust bean gum between about 4:1 to about 1:4, which method comprises:
   (a) charging said particulate water dispersible substance to a granulator;
   (b) contacting substance charged to said granulator, with from 10 to 70 weight percent of molasses, basis dry weight of said substance;
   (c) permitting granulation of the substance charged to said granulator in the presence of said molasses;
   (d) discharging granules from said granulator;
   (e) classifying the granules; and,
   (f) retaining classified granules having size not substantially in excess of about 14 mesh, with less than about 12 weight percent of the retained granules having size between about 40–60 mesh and with less than about 5 weight percent having size finer than about 60 mesh.

5. The method of claim 4 wherein the granules are dried before classifying and the resulting dried granules contain less than about 15 weight percent moisture.

6. The method of claim 4 wherein classified granules having size in excess of about 14 mesh are reduced in size to granules having size below about 14 mesh.

7. The method of claim 4 wherein said substance charged to said granulator is contacted with water and molasses.

8. The method of claim 4 wherein classified granules having size below about 60 mesh are returned to a granulator.

9. The method of claim 4 wherein the substance charged to said granulator is mixed with a pesticidally-active ingredient.

References Cited

UNITED STATES PATENTS

| | | | |
|---|---|---|---|
| 3,206,485 | 9/1965 | Pflaumer | 260—404.5 |
| 3,256,271 | 6/1966 | Schweiger | 424—361 |
| 3,391,061 | 7/1968 | McNeely | 252—316 |
| 2,281,785 | 5/1942 | Mohr | 167—22 |
| 2,792,295 | 5/1957 | Wright | 71—65 |
| 2,821,500 | 1/1958 | Jackson et al. | 167—42 |
| 3,020,206 | 2/1962 | Patton et al. | 195—31 |
| 3,062,637 | 11/1962 | Marples et al. | 71—93 |
| 3,096,293 | 7/1963 | Jeanes et al. | 195—31 |
| 3,143,460 | 8/1964 | Pearce | 167—42 |
| 3,265,629 | 8/1966 | Jensen | 167—42 |
| 3,274,052 | 9/1966 | Yaffe et al. | 167—42 |
| 3,360,356 | 12/1967 | Vartiak | 71—116 |

OTHER REFERENCES

C & E News, "New Pesticide Spray Methods Due This Spring."
C & E News, Mar. 28, 1966.

LEWIS GOTTS, Primary Examiner
G. HOLLRAH, Assistant Examiner

U.S. Cl. X.R.

71—79; 117—100; 252—316; 424—34, 35, 361, 363